(12) United States Patent
Ore et al.

(10) Patent No.: US 9,258,769 B2
(45) Date of Patent: Feb. 9, 2016

(54) APPARATUS, METHOD AND COMPUTER PROGRAM PRODUCT PROVIDING PRIORITY SETTING FOR MULTI-RAT INTERWORKING

(75) Inventors: Ivan Ore, Nummela (FI); Sari Nielsen, Espoo (FI); Jarkko T. Koskela, Oulu (FI); Jukka Ranta, Kaarina (FI); Lars Dalsgaard, Oulu (FI)

(73) Assignee: Google Technology Holdings LLC, Mountain View, CA (US)

( * ) Notice: Subject to any disclaimer, the term of this patent is extended or adjusted under 35 U.S.C. 154(b) by 1770 days.

(21) Appl. No.: 12/069,897

(22) Filed: Feb. 12, 2008

(65) Prior Publication Data

US 2008/0268843 A1 Oct. 30, 2008

Related U.S. Application Data

(60) Provisional application No. 60/901,698, filed on Feb. 12, 2007.

(51) Int. Cl.
*H04W 24/00* (2009.01)
*H04W 48/20* (2009.01)
(Continued)

(52) U.S. Cl.
CPC .......... *H04W 48/20* (2013.01); *H04W 36/0061* (2013.01); *H04W 24/00* (2013.01); *H04W 36/0066* (2013.01); *H04W 48/16* (2013.01); *H04W 48/18* (2013.01)

(58) Field of Classification Search
CPC .............................. H04W 48/20; H04W 24/00
USPC ............. 455/512, 67.11, 432.1, 435.3, 435.1, 455/552.1, 553.1, 435.2
See application file for complete search history.

(56) References Cited

U.S. PATENT DOCUMENTS

| 5,442,806 A | 8/1995 | Barber et al. ................. 455/33.1 |
| 5,754,542 A | 5/1998 | Ault et al. ..................... 370/342 |

(Continued)

FOREIGN PATENT DOCUMENTS

| EP | 0 781 064 A2 | 6/1997 |
| EP | 0 980 190 A1 | 12/2000 |

(Continued)

OTHER PUBLICATIONS

Rohini, P. P., "Over-The-Air Provisioning in CDMA", Gemplus Technologies, Oct. 2004.

(Continued)

*Primary Examiner* — Kwasi Karikari
(74) *Attorney, Agent, or Firm* — Lerner, David, Littenberg, Krumholz & Mentlik, LLP

(57) ABSTRACT

Apparatus, methods and computer program products operate an electronic device to receive through from a wireless communications network a prioritized list of radio access technologies; to store the prioritized list of radio access technologies in a memory of the electronic device; and to consult the prioritized list of radio access technologies during cell selection and reselection operations. In variants the radio access technologies listed in the prioritized list of radio access technologies can be E-UTRAN, UTRAN or GERAN. In a further variant to consult the prioritized list may mean to compare at least one of a signal measurement and a quality measurement with at least one threshold established for a certain radio access technology appearing in the prioritized list, and to select/reselect to the certain radio access technology only if the at least one of the signal measurement and the quality measurement exceeds the threshold.

23 Claims, 3 Drawing Sheets

(51) Int. Cl.
*H04W 36/00* (2009.01)
*H04W 48/16* (2009.01)
*H04W 48/18* (2009.01)

(56) References Cited

U.S. PATENT DOCUMENTS

| | | | |
|---|---|---|---|
| 5,903,382 A | 5/1999 | Tench et al. | 359/265 |
| 5,903,832 A | 5/1999 | Seppanen et al. | 455/414 |
| 5,915,214 A | 6/1999 | Reece et al. | 455/406 |
| 6,119,003 A | 9/2000 | Kukkohovi | 455/435 |
| 6,208,857 B1 | 3/2001 | Agre et al. | 455/428 |
| 6,438,369 B1 | 8/2002 | Huang et al. | 455/417 |
| 6,625,451 B1 | 9/2003 | La Medica, Jr. et al. | 455/434 |
| 6,684,082 B1 | 1/2004 | McClure | 455/552.1 |
| 6,728,536 B1 | 4/2004 | Basilier et al. | 455/432 |
| 6,748,217 B1 | 6/2004 | Hunzinger et al. | 455/435.2 |
| 6,751,460 B2 | 6/2004 | Korpela et al. | 455/435.2 |
| 6,766,169 B2 | 7/2004 | Cooper | 455/435.2 |
| 6,873,836 B1 | 3/2005 | Sorrells et al. | 455/313 |
| 6,934,544 B2 | 8/2005 | Cooper et al. | 455/435.2 |
| 6,978,142 B2 | 12/2005 | Jokimies | 455/449 |
| 7,069,026 B2 | 6/2006 | McClure | 455/456.3 |
| 7,072,651 B2 | 7/2006 | Jiang et al. | 455/432.1 |
| 7,120,436 B2 | 10/2006 | Kim | 455/433 |
| 7,167,707 B1 | 1/2007 | Gazzard et al. | 455/434 |
| 7,277,705 B2 | 10/2007 | Casaccia et al. | 455/435.1 |
| 7,313,398 B1* | 12/2007 | Ramahi | 455/436 |
| 2002/0087674 A1 | 7/2002 | Guilford et al. | 709/223 |
| 2003/0017842 A1 | 1/2003 | Moles et al. | 455/552 |
| 2003/0134637 A1 | 7/2003 | Cooper | 455/432 |
| 2003/0148774 A1 | 8/2003 | Naghian et al. | 455/456 |
| 2004/0148352 A1 | 7/2004 | Menon et al. | 709/205 |
| 2004/0224689 A1* | 11/2004 | Raghuram et al. | 455/435.3 |
| 2004/0235475 A1 | 11/2004 | Ishii | 455/435.3 |
| 2005/0037755 A1 | 2/2005 | Hind et al. | 455/435.3 |
| 2005/0083899 A1 | 4/2005 | Babbar et al. | 370/342 |
| 2005/0227688 A1* | 10/2005 | Li et al. | 455/432.1 |
| 2005/0227692 A1 | 10/2005 | Kawashima et al. | 455/435.2 |
| 2005/0277416 A1* | 12/2005 | Tolli et al. | 455/436 |
| 2006/0234705 A1 | 10/2006 | Oommen | 455/435.3 |
| 2006/0282554 A1 | 12/2006 | Jiang et al. | 710/14 |
| 2007/0019575 A1* | 1/2007 | Shaheen | 370/310 |

FOREIGN PATENT DOCUMENTS

| | | |
|---|---|---|
| EP | 1 246 499 A1 | 10/2002 |
| EP | 1 519 615 A2 | 3/2005 |
| WO | WO-97/30561 A1 | 8/1997 |
| WO | WO 03/067918 A1 | 8/2003 |
| WO | WO-03/100647 A1 | 12/2003 |
| WO | WO 2005/117463 A2 | 12/2005 |
| WO | WO 2005/117468 A1 | 12/2005 |
| WO | WO-2005/122601 A2 | 12/2005 |

OTHER PUBLICATIONS

3GPP2 C.S0064-0, 3$^{rd}$ Generation Partnership Project 2, "IP Based Over-the-Air Device Management (IOTA_DM) for cdma2000 Systems", Release 0, Version 1.0, Sep. 6, 2005.

"TR for Network Selection Principles v.0.2.0", Paul Carpenter, TSG-SA WG1 #28, XP-002579978, Apr. 2005, 16 pgs.

"Use of the Radio Access Technology (RAT) during background scanning", 3GPP TSG-CN Meeting #23, Mar. 2004, 4 pgs.

"Issues relating to use of radio access technology (RAT) in the periodic PLMN scan", 3GPP TSG-CN Meeting #23, Mar. 2004, 8pgs.

3GPP TS 25.304 V7.1.0 (Dec. 2006), "3$^{rd}$ Generation Partnership Project; Technical Sepcification Group Radio Access Network; User Equipment (UE) procedures in idle mode and procedures for cell reselection in connected mode (Release 7)", 38 pgs.

3GPP TS 45.008 V7.6.0 (Nov. 2006), "3$^{rd}$ Generation Partnership Project; Technical Specification Group GSM/EDGE Radio Access Network; Radio subsystem link control (Release 7)", 113 pgs.

* cited by examiner

APPARATUS, METHOD AND COMPUTER PROGRAM PRODUCT PROVIDING PRIORITY SETTING FOR MULTI-RAT INTERWORKING

CROSS REFERENCE TO A RELATED UNITED STATES PATENT APPLICATION

This application hereby claims priority under 35 U.S.C. §119(e) from provisional U.S. Patent Application No. 60/901,698 entitled "APPARATUS, METHOD AND COMPUTER PROGRAM PRODUCT PROVIDING PRIORITY SETTING FOR MULTI-RAT INTERWORKING" filed on Feb. 12, 2007 by Ivan Ore, Sari Nielsen, Jarkko Koskela, Jukka Ranta and Lars Dalsgaard. This preceding provisional application is hereby incorporated by reference in its entirety.

TECHNICAL FIELD

The exemplary and non-limiting embodiments of this invention relate generally to wireless communication systems, methods, devices and computer program products and, more specifically, relate to techniques to enable interworking between various RATs.

BACKGROUND

Various abbreviations that appear in the specification and/or in the drawing figures are defined as follows:
RAT radio access technology
HCS hierarchical cell structure
RRC radio resource control
DRX discontinuous reception
LTE long term evolution
eNodeB evolved Node B (base station in the evolved UTRAN)
UE user equipment
EPC evolved packet core network
E-UTRAN evolved UTRAN
SAE system architecture evolution
UTRAN UMTS terrestrial radio access network (3GPP TS25.401)
GERAN GSM EDGE radio access network
GSM global system for mobile communication
EDGE enhanced data rates for GSM evolution At present many network operators employ heterogeneous networks. This means that these networks are composed of different radio technologies (different RATs). For example, it is quite common to find a network operator providing both GERAN and UTRAN in the same geographical area. In the future one can expect to find GERAN, UTRAN and EUTRAN networks all under the control of a single network operator.

A terminal (e.g., also referred to herein as a UE, such as a cellular phone) operating in a heterogeneous network should be able to move smoothly and seamlessly between different RATs. For this reason, the access technologies include interworking capabilities to interact with other access technologies.

As more access technologies become available an operator may wish to create different subscription levels so that specific subscriber types can be assigned to specific collections of access technologies. However, this type of operation implies the existence of some guidance for terminals allocated to specific access technologies to move across these technologies. At present, there are no priority instructions given from the operator to terminal about which radio access technology should be a preferred one as compared to radio access technology.

In the case of GERAN-UTRAN interworking there is no explicit indication about which is the preferred system for the terminal to camp on. However, this is handled implicitly by setting up a cell reselection configuration in such a manner that it forces a terminal UE with GERAN and UTRAN capabilities to camp on the UTRAN network whenever possible. Alternatively HCS cell reselection criteria may be used for allowing some prioritization, especially from UTRAN to GERAN. However, the HCS cell reselection scheme has not been widely deployed due at least to a perceived problem of excessive parameterization. Additionally, not all terminals support HCS cell reselection.

Further, currently used simple methods for cell reselection priorities are not efficient if more than two RATs are available to the terminal, e.g., the terminal is allowed access to GERAN, UTRAN and EUTRAN networks.

In a dedicated mode the network may assign some prioritization, however this procedure is slow and increases the signaling load, as the network needs to signal the terminal every time an attempt is made to access another, higher priority access technology.

In general, cell reselection criteria for UTRA is defined in 3GPP TS 25.304, V7.1.0 (2006-12), 3rd Generation Partnership Project; Technical Specification Group Radio Access Network; User Equipment (UE) procedures in idle mode and procedures for cell reselection in connected mode (Release 7), and cell reselection criteria for GERAN is defined in 3GPP TS 45.008, V7.6.0 (2006-11), 3rd Generation Partnership Project; Technical Specification Group GSM/EDGE; Radio Access Network; Radio subsystem link control (Release 7.

Reference can also be made to commonly owned U.S. Pat. No. 6,751,460 B2, Methods and Apparatus for Performing Cell Reselection for Supporting Efficiently Hierarchical Cell Structures, Sari Korpela and Kaj Jansen.

Also of interest is commonly owned U.S. Pat. No. 6,978,142 B2, Cell Prioritizing in a Cellular Radio System, Matti Jokimies; commonly owned US Patent Publication No.: US 2006/0234705 A1, Method, Apparatus and Computer Program Providing for Rapid Network Selection in a Multimode Device, Paul Oommen; and commonly owned US Patent Publication No.: US 2006/0282554 A1, Method, Apparatus and Computer Program Providing Network-Associated System Priority List for Multimode System Selection, Jack Yuefeng Jiang, Paul Oommen, Yi Cheng and Liangchi Hsu.

SUMMARY OF THE INVENTION

A first embodiment of the invention is an electronic device comprising: a radio apparatus configured to perform bidirectional communication operations in a wireless communications network; a memory configured to store information; a controller configured to receive through the radio apparatus from the wireless communications network a prioritized list of radio access technologies; to store the prioritized list of radio access technologies in the memory; and to consult the prioritized list of radio access technologies during cell selection and reselection operations.

A second embodiment of the invention is a computer program product comprising a computer readable memory medium tangibly embodying a computer program, the computer program configured to operate an electronic device, wherein when the computer program is executed the electronic device is configured to operate an electronic device, wherein when the computer program is executed the electronic device is configured to receive from a wireless communications network a prioritized list of radio access technologies; to store the prioritized list of radio access technologies in a memory of the electronic device; and to consult the prioritized list of radio access technologies during cell selection and reselection operations.

A third embodiment of the invention is a method comprising: at an electronic device operative in a wireless communications network, receiving from the wireless communications network a prioritized list of radio access technologies; storing the prioritized list of radio access technologies in a memory of the electronic device; and consulting the prioritized list of radio access technologies during cell selection and reselection operations.

A fourth embodiment of the invention is an electronic device comprising: a radio apparatus configured to perform bidirectional communication operations in a wireless communications network; and a controller configured to generate a prioritized list of radio access technologies to be used by other electronic devices operative in the wireless communications network during cell selection/reselection operations; and to operate the radio apparatus to communicate the prioritized list of radio access technologies to the other electronic devices.

A fifth embodiment of the invention is a computer program product comprising a computer readable memory medium tangibly embodying a computer program, the computer program configured to operate an electronic device, wherein when the computer program is executed the electronic device is configured to generate a prioritized list of radio access technologies to be used by other electronic devices operative in a wireless communications network during cell selection/reselection operations; and to operate radio apparatus to communicate the prioritized list of radio access technologies to the other electronic devices.

A sixth embodiment of the invention is a method comprising: at an electronic device operative in a wireless communications network, generating a prioritized list of radio access technologies to be used by other electronic devices operative in the wireless communications network during cell selection/reselection operations; and operating radio apparatus to communicate the prioritized list of radio access technologies to the other electronic devices.

DETAILED DESCRIPTION

The exemplary embodiments of this invention relate generally to UTRAN LTE, and relate also to, for example, GERAN, UTRAN and to other cellular networks with interworking capabilities.

For the purposes of describing the exemplary embodiments of this invention a specific access technology not only refers to the radio technology in use (e.g., EUTRAN, GERAN, UTRAN) but also may be associated with a specific frequency carrier or band. For example, one may consider UTRAN in a frequency carrier 1 and UTRAN in a frequency carrier 2 as being two different access technologies.

The exemplary embodiments of this invention fulfill a need to enable prioritization amongst different frequency carriers associated with a same access technology (e.g., EUTRAN (carrier 1, carrier 2 . . . , carrier n).

Figure 1:
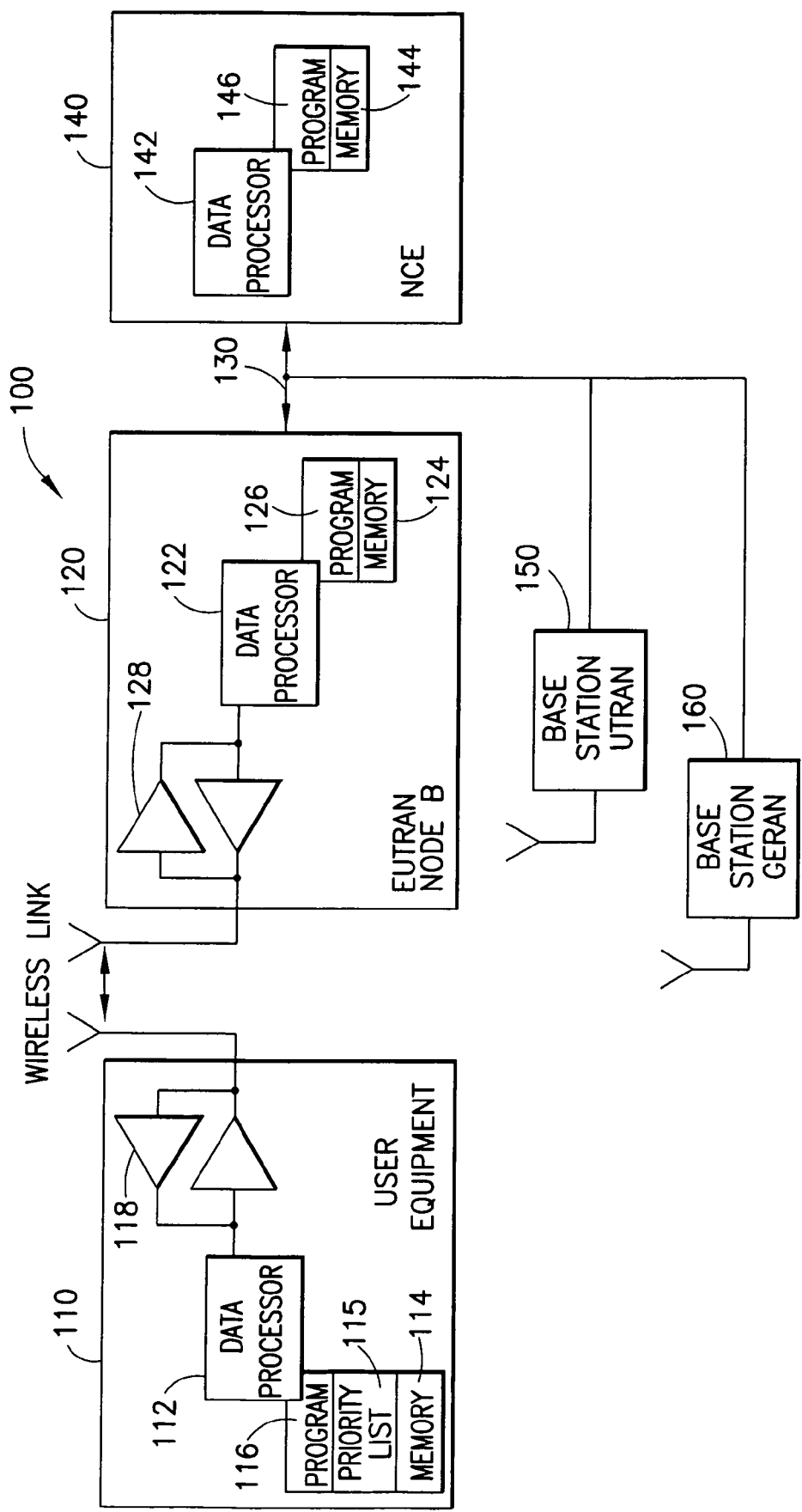
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 100 is adapted for communication with a UE 110 via a Node B (base station) 120. The network 100 may include a network control element (NCE) 140. The UE 110 includes a data processor (DP) 112, a memory (MEM) 114 that stores a program (PROG) 116, and a suitable radio frequency (RF) transceiver 118 for bidirectional wireless communications with the Node B 120, which also includes a DP 122, a MEM 124 that stores a PROG 126, and a suitable RF transceiver 128. The Node B 120 is coupled via a data path 130 to the NCE 140 that also includes a DP 142 and a MEM 144 storing an associated PROG 146. At least one of the PROGs 116 and 126 is assumed to include program instructions that, when executed by the associated DP, enable the electronic device to operate in accordance with the exemplary embodiments of this invention, as will be discussed below in greater detail.

Also shown in FIG. 1 are two additional base stations 150 and 160, for example, a UTRAN base station 150 and a GERAN base station 160, respectively. Base stations 150 and 160 may be coupled to the same NCE 140 as the EUTRAN Node B 120, as shown. The base stations 150 and 10 may be constructed in a manner similar to the EUTRAN Node B 120.

The exemplary embodiments of this invention may be implemented at least in part by computer software executable by the DP 112 of the UE 110 and by the DP 122 of the Node B 120 (and corresponding DPs of the base stations 150 and 160), or by hardware, or by a combination of software and hardware.

In general, the various embodiments of the UE 110 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention provide for the use of priority indicators by which a network operator, such as the operator of the network 100 in FIG. 1, can inform the UE 110 of priorities between UE 110 allowed access technologies. As considered herein allowed access technologies may either be all the access technologies/frequency bands that the UE 110 supports based on its capabilities, or a subset of the supported access technologies based on operator limitations. The UE 110 stores in the memory 114 the list of priorities (shown as Priority List 115 in FIG. 1) and uses them to move to an access technology with the highest possible priority in the case of a network command (or a UE-determination) to abandon a current access technology. The priorities may be signaled to the UE 110 in any of a number of ways. The UE 110 may be requested to update its priorities based on system information (SI) changes, and/or only when explicitly requested by the network to update the priorities. The priorities are typically semi-static in nature.

The exemplary embodiments of this invention differ from the HCS approach discussed previously in several important aspects. For example, the HCS approach establishes some type of priorities during the idle mode, whereas the priorities established in accordance with the exemplary embodiments of this invention pertain to both the idle mode and to the dedicated mode. Further by example, HCS operates based on a comparison of signal levels between serving and target cells. The exemplary embodiments of this invention do not rely on or compare power levels between different cells, but instead promote access to higher priority access technologies only if the higher priority access technology meets certain radio conditions.

In the exemplary embodiments of this invention the UE 110 is informed of a given priority for a given access technology (including frequency band/carrier) that the UE 110 is allowed to access. The following non-limiting examples illustrate this principle, where the number in parentheses (indicates the priority level, and fx indicates a frequency band:
Example 1: EUTRAN (1), UTRAN (2), GERAN (3);
Example 2: EUTRAN f3 (1), EUTRAN f4 (2), EUTRAN f5 (3);
EXAMPLE 3: EUTRAN f3 (1), UTRAN f6 (2), GERAN f7 (3).

Note in accordance with the exemplary embodiments of this invention that in Example 2 all of the radio access technologies are EUTRAN, and differ by frequency carrier/band. In this case the different frequency carriers f3, f4 and f5 associated with a single access technology are prioritized by the network for the UE 110.

Note in this regard that two frequency carriers/bands may overlap one another, or they may be entirely distinct from one another.

The priorities may be broadcast to the UE 110 (via System Information signaling), and/or they may be provided during special RRC signaling or by UE-core network signaling. The UE 110 may keep the priority list 115 in the memory 114 even after abandoning the current network. Alternatively, the priorities may be given to the UE 110 in each access network where the UE 110 is located.

The UE 110 utilizes the priorities as follows. If the UE 110 is commanded by the network 100 to abandon the current network (e.g., due to load reasons), the UE 110 accesses the priority list 115 in order to determine which radio access technology the UE 110 should go/reselect to. In a case where the UE 110 is connected the UE 110 re-establishes the connection using the newly selected access technology. If the UE 110 is on an access technology which is not the highest priority access technology (e.g., in Example 1 above the UE 110 finds itself connected via UTRAN or GERAN), the UE 110 attempts to search, measure and reselect to a suitable cell in a higher priority access technology, based on the priority list 115 and on certain minimum signal strength and signal quality thresholds. These minimum signal strength and/or quality threshold(s) may be different from the normal suitability thresholds (e.g., those known as S criteria in UTRA, 3GPP TS 25.304) in order to allow additional hysteresis during cell reselection, as well as to better control the acceptable quality/signal level in a newly selected access technology and selected cell.

A change of access technology may occur after a command from the network 100 (in the current access technology) wherein the UE 110 may be enabled to initiate certain inter-RAT/inter-frequency measurements. The change of access technology may occur after the UE 110 has autonomously initiated inter-RAT/inter-frequency measurements based on priority knowledge obtained from the priority list 115. The inter-RAT/inter-frequency measurements may also be performed in a periodic manner regardless of the priorities. Certain of the UE 110 measurement details are implementation dependent, although some minimum requirements are defined in the performance specifications and through (RAN2) specifications (e.g., for power saving purposes the UE 110 may reduce the number of measurements made, such as inter-frequency and inter-RAT measurements, during DRX). The number of measurements may also be minimized during a limited DRX period for performing inter-frequency and inter-RAT measurements. In order to minimize the number of different type of measurements the UE 110 may utilize the priority list 115 and the fact that a predefined minimum signal strength and/or quality threshold(s) is met at least for one cell in at least one of the higher priority access technologies. As opposed to using certain predefined minimum signal strength and/or quality threshold(s) it may be sufficient that the UE 110 has identified at least one cell in at least one of the higher priority access technologies.

The establishment and use of the priority list 10E may be included in cell reselection criteria defined for use in E-UTRAN specifications, and possibly also may be included by changes to UTRAN and GERAN specifications. Additionally, the priorities may be utilized for minimizing UE 110 measurements, and changing access technology based on a network command, in current access technologies.

Assume a case where the UE 110 abandons the current access technology and selects a cell in another access technology (according to the priority list 115 and corresponding cell reselection criteria where relevant). Before abandoning the current network, the UE 110 may be requested to verify if the conditions to access the target access technology (target cell) meet certain predefined criteria. These predefined criteria may be based on a certain minimum reference signal strength or quality levels, e.g., minimum power level to access a cell. If none of the cells in the highest priority access technology meet the set of predefined criteria, the UE 110 may search for another cell associated with a next highest priority access technology.

One clear advantage that is gained by the use of the exemplary embodiments of this invention is that the allocation of priorities to the UEs 110 gives the operator an important tool to maintain the UEs 110 in the best access technology (and on a preferred frequency carrier/band), while at the same time providing the UE with access to different access technologies.

Another clear advantage that is gained by the use of the exemplary embodiments of this invention is that user satisfaction is enhanced, since the probability is increased of operating in the "best" network, and on a "best" frequency carrier/band within the "best network".

Figure 2:
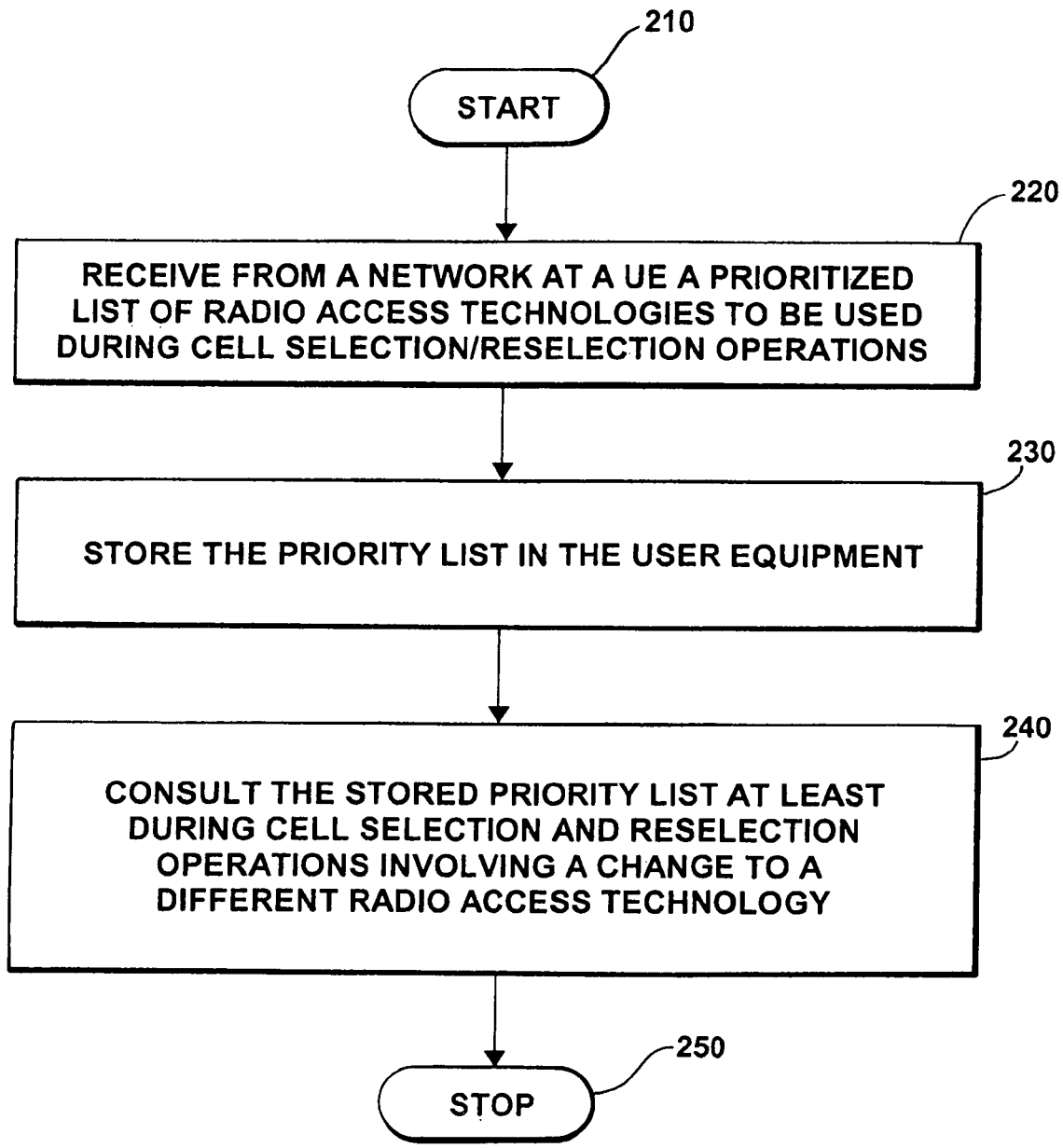
FIG. 2 is a logic flow diagram that illustrates a method, and the operation of a computer program product, in accordance with the exemplary embodiments of this invention.

A method operating in accordance with the invention is depicted in FIG. 2. The method starts at 210. Then, at 220 a UE 110 like that depicted in FIG. 1 receives from a wireless communications network a prioritized list of radio access technologies. Next, at 230, the UE 110 stores the prioritized list in the memory 114 of the UE 110. Then, at 240, the UE 110 consults the stored priority list at least during cell selection and reselection operations that may involve a change to a different radio access technology. The method stops at 250. Embodiments of the invention comprising apparatus and computer program products are configured to perform the steps of the method depicted in FIG. 2.

In a variant of the method depicted in FIG. 2, the prioritized list comprises at least two entries for the same radio access technology, but where the two entries for the same radio access technology differ from one another by frequency carrier. In other variants of the method depicted in FIG. 2, the cell selection/reselection operations involving a change to a different radio access technology may be initiated in response to a command received from the wireless communications network, or in autonomously by the wireless communications device.

The method, apparatus and computer program product(s) of the preceding paragraph, where the list comprises different radio access technologies.

The method, apparatus and computer program product(s) of the preceding paragraphs, where the list comprises at least one E-UTRAN radio access technology.

The method, apparatus and computer program product(s) of the preceding paragraphs, where by example the list comprises at least two EUTRAN radio access technology entries that operate on two frequency carriers/bands.

The method, apparatus and computer program product(s) of the preceding paragraphs, where by example the list comprises at least two UTRAN radio access technology entries that operate on two frequency carriers/bands.

The method, apparatus and computer program product(s) of the preceding paragraphs, where by example the list comprises at least two GERAN radio access technology entries that operate on two frequency carriers/bands.

The method, apparatus and computer program product(s) of the preceding paragraphs, where consulting the stored priority list includes comparing at least one of signal and quality measurements with at least one threshold established for a certain radio access technology, and selecting/reselecting to the certain radio access technology only if the at least one of the signal and quality measurements exceed the threshold.

The various blocks shown in FIG. 2 may be viewed as method steps, and/or as operations that result from operation of computer program code, and/or as a plurality of coupled logic circuit elements constructed to carry out the associated function(s).

Figure 3:
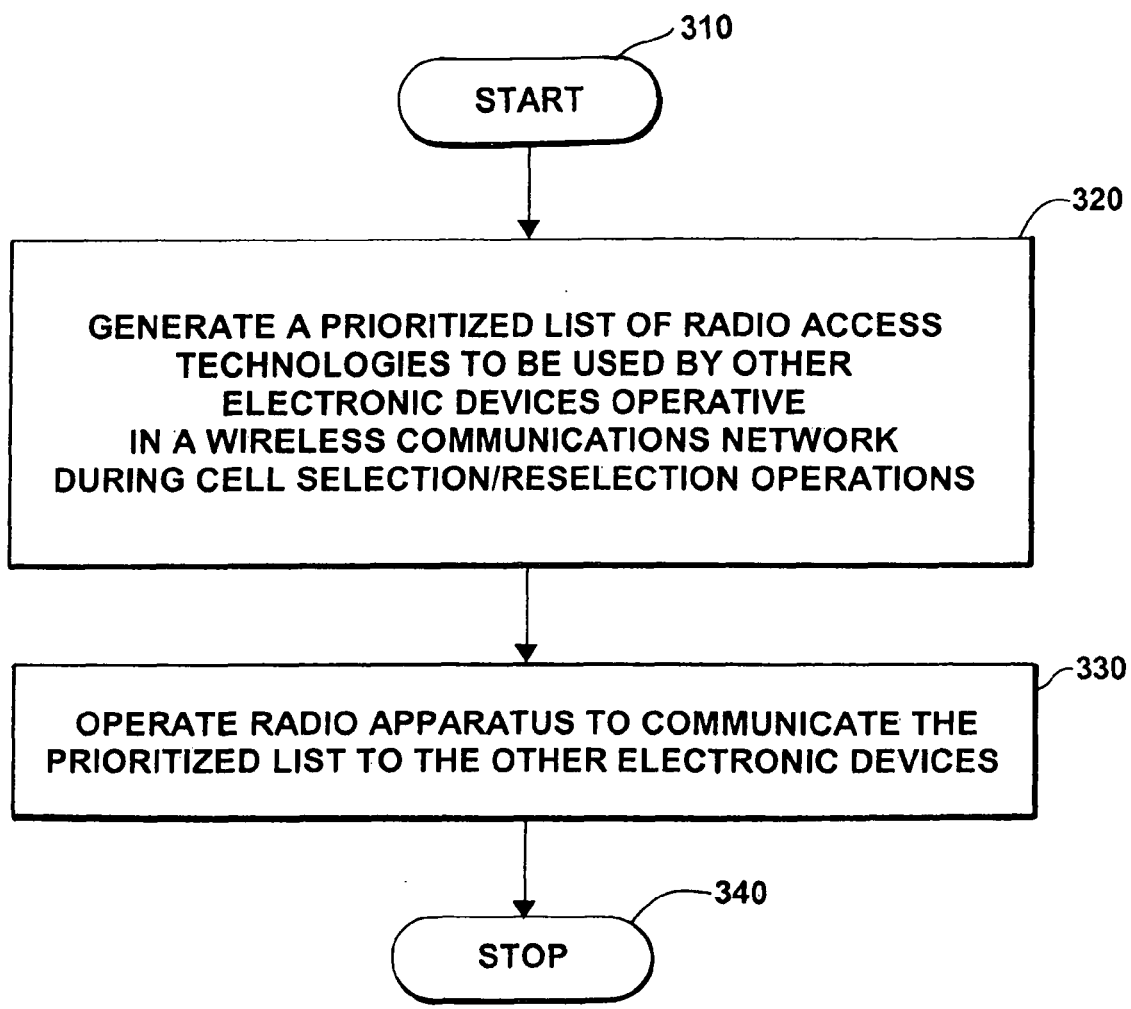
FIG. 3 is a logic flow diagram that illustrates another method, and the operation of another computer program product, in accordance with the exemplary embodiments of this invention.

FIG. 3 depicts a method in accordance with the invention that is performed at a base station 120 like that depicted in FIG. 2. The method starts at 310. Then, at 320, the base station 120 generates a prioritized list of radio access technologies to be used by other electronic devices operative in a wireless communications network during cell selection/reselection operations. Next, at 330, the base station 120 operates radio apparatus to communicate the prioritized list to the other electronic devices operative in the wireless communications network. The method stops at 340.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE), GERAN and UTRAN systems, it should be appreciated that the exemplary embodiments of this invention are not limited for use with only these particular type of wireless communication systems, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
a receiver configured to receive, from a wireless network operator, a list comprising a plurality of radio access technologies and a plurality of frequency carriers, each of the plurality of frequency carriers being associated with at least one of the plurality of radio access technologies, each of the radio access technologies and its associated frequency carrier being ranked in order of priority;
a memory configured to store the list; and
a user equipment controller configured to consult the stored list comprising the plurality of radio access technologies, compare at least one of a signal measurement and a quality measurement with at least one threshold established for a certain radio access technology of the plurality of radio access technologies, and to select/reselect the certain radio access technology only if the at least one of the signal measurement and the quality measurement exceeds the at least one threshold,
wherein the user equipment consults the list to determine the highest ranking radio access technology and its associated frequency carrier, and when the user equipment is not using the highest ranking radio access technology and its associated frequency carrier, the user equipment attempts to switch to the highest ranking radio access technology and its associated frequency carrier.

2. The apparatus of claim 1, wherein at least one radio access technology of the plurality is deemed to be allowed by the wireless network operator.

3. The apparatus of claim 1, wherein at least two of the radio access technologies of the plurality are different from one another.

4. The apparatus of claim 1, where the at least one radio access technology of the plurality is selected from the group consisting of:
an evolved universal mobile telecommunications system (UMTS) terrestrial radio access network (E-UTRAN) radio access technology, a universal mobile telecommunications system (UMTS) terrestrial radio access network (UTRAN) radio access technology and a global system for mobile communication (GSM) enhanced data rates for GSM evolution (EDGE) radio access network (GERAN) radio access technology.

5. The apparatus of claim 1, wherein the controller is configured to utilize the list during at least one of cell selection and cell reselection.

6. The apparatus of claim 1, wherein the list is received via system information signaling.

7. The apparatus of claim 1, wherein the receiver is further configured to receive updates for the list via system information changes.

8. The apparatus of claim 1, wherein the list specifies priority amongst different frequency carriers associated with evolved universal mobile telecommunications system (UMTS) terrestrial radio access network (E-UTRAN) radio access technology.

9. The apparatus of claim 1, wherein the plurality of radio access technologies comprises evolved universal mobile telecommunications system (UMTS) terrestrial radio access network (E-UTRAN) radio access technology.

10. The apparatus of claim 1, wherein the apparatus comprises a user equipment.

11. A method comprising:
receiving, from a wireless network, a list comprising a plurality of radio access technologies and a plurality of frequency carriers, each of the plurality of frequency carriers being associated with at least one of the plurality of radio access technologies, each of the plurality of radio access technologies and its associated frequency carrier being ranked in order of priority;
storing the list;
measuring at least one of a signal measurement and a quality measurement for each radio access technology of the plurality of radio access technologies;
comparing the at least one signal measurement and quality measurement with at least one threshold established for each radio access technology of the plurality of radio access technologies;
determining, using a user equipment, which of the plurality of radio access technologies and which of the plurality of frequency carriers a wireless device should access based at least in part on the list; and
selecting, using the user equipment, a particular radio access technology from the plurality of radio access technologies for access only if the at least one of the signal measurement and the quality measurement exceeds the at least one threshold,
wherein the user equipment consults the list to determine the highest ranking radio access technology and its associated frequency carrier, and when the user equipment is not using the highest ranking radio access technology and its associated frequency carrier, the user equipment attempts to switch to the highest ranking radio access technology and its associated frequency carrier.

12. The method of claim 11, wherein the at least one of the plurality of radio access technologies is deemed to be allowed by the wireless network operator.

13. The method of claim 11, wherein at least two of the radio access technologies of the plurality are different from one another.

14. The method of claim 11, wherein the list specifies priority amongst different frequency carriers associated with evolved universal mobile telecommunications system (UMTS) terrestrial radio access network (E-UTRAN) radio access technology.

15. The method of claim 11, wherein the plurality of radio access technologies comprises evolved universal mobile telecommunications system (UMTS) terrestrial radio access network (E-UTRAN) radio access technology.

16. A method for communicating over a plurality of radio access technologies and a plurality of frequency bands, the method comprising:
consulting, using a user equipment, a list of the plurality of radio access technologies, each of the plurality of radio access technologies in the list having associated therewith frequency band of the plurality of frequency bands, each radio access technology and its associated frequency band having a predetermined priority level;
measuring at least one of a signal measurement and a quality measurement for each of the plurality of radio access technologies in the list;
comparing the at least one signal measurement and quality measurement with at least one threshold established for each of the plurality of radio access technologies in the list; and
establishing, using the user equipment, a wireless connection with a network using one of radio access technologies of the plurality of radio access technologies and using the frequency band associated with the radio access technology only if the at least one of the signal measurement and the quality measurement exceeds the at least one threshold,
wherein the user equipment consults the list to determine the highest ranking radio access technology and its associated frequency carrier, and when the user equipment is not using the highest ranking radio access technology and its associated frequency carrier, the user equipment attempts to switch to the highest ranking radio access technology and its associated frequency carrier.

17. The method of claim 16, further comprising:
ceasing communication using the radio access technology with which the wireless connection was established during the establishing step;
repeating the consulting step, the measuring step, and the comparing step; and
repeating the establishing step with a different one of the plurality of radio access technologies.

18. The method of claim 16, further comprising
ceasing communication with a first cell with which the wireless connection was established during the establishing step;
repeating the consulting step, the measuring step, and the comparing step; and
repeating the establishing step with a different one of the plurality of radio access technologies and with a second cell.

19. The method of claim 16, further comprising receiving the list over a wireless communication network, wherein the list comprises a plurality of entries, each entry comprising a radio access technology and a frequency.

20. A method for communicating on a wireless device, the method comprising:

receiving a list comprising a plurality of radio access technologies and a frequency band associated with each radio access technology of the plurality, each radio access technology and its associated frequency band having a predetermined priority level;

reviewing, at the wireless device, the list to determine whether a first radio access technology and frequency band currently being used by the wireless device is the highest predetermined priority level;

measuring at least one of a signal measurement and a quality measurement for each of the plurality of radio access technologies in the list;

comparing the at least one signal measurement and quality measurement with at least one threshold established for each of the plurality of radio access technologies in the list;

switching, at the wireless device, from a first radio access technology and its associated frequency to a second radio access technology and its associated frequency only if the at least one of the signal measurement and the quality measurement exceeds the at least one threshold, wherein the wireless device consults the list to determine the highest ranking radio access technology and its associated frequency carrier, and when the wireless device is not using the highest ranking radio access technology and its associated frequency carrier, the wireless device attempts to switch to the highest ranking radio access technology and its associated frequency carrier.

21. The method of claim 20, further comprising receiving a command from a wireless network to abandon the first radio access technology.

22. The method of claim 20, wherein at least two of the radio access technologies of the plurality of radio access technologies are the same, but their respective associated frequency bands are different.

23. The method of claim 20, wherein the switching step further comprises switching from communicating with a first cell using the first radio access technology and its associated frequency band to communicating with a second cell using the second radio access technology and its associated frequency band.

* * * * *